(12) United States Patent
Bialer et al.

(10) Patent No.: US 11,047,973 B2
(45) Date of Patent: Jun. 29, 2021

(54) ULTRA-WIDE BAND RADAR CALIBRATION AND ANGLE OF ARRIVAL ESTIMATION

(71) Applicant: GM GLOBAL TECHNOLOGY OPERATIONS LLC, Detroit, MI (US)

(72) Inventors: Oded Bialer, Petah Tivak (IL); Igal Bilik, Rehovot (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 343 days.

(21) Appl. No.: 16/126,197

(22) Filed: Sep. 10, 2018

(65) Prior Publication Data

US 2020/0081114 A1 Mar. 12, 2020

(51) Int. Cl.
| | |
|---|---|
| *G01S 13/68* | (2006.01) |
| *G01S 13/931* | (2020.01) |
| *G01S 13/02* | (2006.01) |
| *G01S 7/40* | (2006.01) |
| *G01S 7/35* | (2006.01) |

(52) U.S. Cl.
CPC .............. *G01S 13/68* (2013.01); *G01S 7/352* (2013.01); *G01S 7/40* (2013.01); *G01S 13/0209* (2013.01); *G01S 13/931* (2013.01)

(58) Field of Classification Search
CPC .... G01S 13/68; G01S 13/0209; G01S 13/931; G01S 7/352; G01S 7/40
USPC .................................................. 342/417, 71
See application file for complete search history.

(56) References Cited

U.S. PATENT DOCUMENTS

2006/0158375 A1* 7/2006 Macleod ................... G01S 3/14
342/417

\* cited by examiner

*Primary Examiner* — Bo Fan
(74) *Attorney, Agent, or Firm* — Cantor Colburn LLP (57) ABSTRACT

A vehicle, radar system and method of determining an angle of arrival of an object is disclosed. A radar array generates a linear frequency modulated source signal and includes a first channel and a second channel for receiving a reflection of the source signal from the object. A processor obtains a channel response for the first radar channel and for the second radar channel over a bandwidth of the source signal, partitions the frequency band into a plurality of frequency sub-bands, determines a variation between the first and second channel responses for a selected frequency sub-band, receives a reflection of the source signal at the first channel and at the second channel, corrects at least the second channel within the frequency sub-band using the determined variation, and determines an angle of arrival for the object based on the correction within the frequency sub-band.

26 Claims, 6 Drawing Sheets

ULTRA-WIDE BAND RADAR CALIBRATION AND ANGLE OF ARRIVAL ESTIMATION

INTRODUCTION

The subject disclosure relates to radar detection systems and methods and, in particular, to methods of calibrating an ultra-wide bade radar to improve angle of arrival estimates.

Radar systems are used in vehicles in order to help navigate the vehicle with respect to objects in its environment. In a radar system, high resolution of a radar parameter can be obtained by using a wide signal bandwidth, i.e., a bandwidth of greater than about 500 Megahertz. However, the circuitry responsible for operating antenna channels tends to provide responses that vary over the extent of the bandwidth. These variations tend to distort the response of a radar array at different frequencies and thereby degrade the accuracy of an angle of arrival parameter estimate. Accordingly, it is desirable to provide a method for overcoming the distortion that occurs in angle of arrival parameter measurements in ultra-wide bandwidth radar.

SUMMARY

In one exemplary embodiment, a method of determining an angle of arrival of an object using a radar system is disclosed. The method includes obtaining channel responses for a first radar channel and a second radar channel over a bandwidth of a frequency band, partitioning the frequency band into a plurality of frequency sub-bands, for a selected frequency sub-band, determining a variation between the channel response of the first channel and the channel response of the second channel, performing a correction to at least the second channel within the frequency sub-band using the determined variation, and determining an angle of arrival for the object based on the correction within the frequency sub-band.

In addition to one or more of the features described herein, the variation for the selected frequency sub-band is a difference between a parameter of a calibration signal received at the first channel and a parameter of the calibration signal received at the second channel. The parameter is at least one of a signal amplitude and a signal phase. A width of the frequency sub-band is selected so that a variation in the channel response for at least one of the first channel and the second channel is less than a selected tolerance within the frequency sub-band. In one embodiment, the method further includes receiving, from the object, a first signal at the first channel and a second signal at the compensated second channel, performing the correction by applying the variation to the second signal at a plurality of the frequency sub-bands to obtain a corrected second signal for each of the plurality of frequency sub-bands, compensating for differences between the first signal and the corrected second signal in a first frequency sub-band and the first signal and the corrected second signal in a second frequency sub-band, and determining an angle of arrival using the first signal and the corrected second signal compensated for differences between frequency sub-bands. In another embodiment, the method further includes receiving, from the object, a first signal at the first channel and a second signal at the second channel, performing the correction by applying the variation to the second signal at a plurality of the frequency sub-bands to obtain a corrected second signal for each of the plurality of frequency sub-bands, for each of the plurality of frequency sub-bands, determining an angle of arrival for the object using the first signal and the corrected second signal at the frequency sub-band, and determining an average angle of arrival for the object from the angles of arrival determined for each of the plurality of frequency sub-bands. The method further includes navigating a vehicle with respect to the object based on the determined angle of arrival.

In another exemplary embodiment, a radar system for determining an angle of arrival of an object is disclosed. The radar system includes a radar array and a processor. The radar array is configured to generate a linear frequency modulated source signal and includes at least a first channel and a second channel for receiving a reflection of the source signal from the object. The processor is configured to obtain channel response for the first radar channel and a channel response for the second radar channel over a bandwidth of a source signal, partition the frequency band into a plurality of frequency sub-bands, for a selected frequency sub-band, determine a variation between the channel response of the first channel and the channel response of the second channel, receive a reflection of the source signal at the first channel and at the second channel, perform a correction to at least the second channel within the frequency sub-band using the determined variation, and determine an angle of arrival for the object based on the corrected within the frequency sub-band.

In addition to one or more of the features described herein, the variation for the selected frequency sub-band is a difference between a parameter of a calibration signal received at the first channel and a parameter of the calibration signal received at the second channel. The parameter is at least one of a signal amplitude and a signal phase. The processor is further configured to select a width of the frequency sub-band so that a variation in the channel response for at least one of the first channel and the second channel is less than a selected tolerance within the frequency sub-band. In one embodiment, the processor is further configured to receive, from the object, a first signal at the first channel and a second signal at the compensated second channel, perform the correction by applying the variation to the second signal at a plurality of the frequency sub-bands to obtain a corrected second signal for each of the plurality of frequency sub-bands, compensate for differences between the first signal and the corrected second signal in a first frequency sub-band and the first signal and the corrected second signal in a second frequency sub-band, and determine an angle of arrival using the first signal and the corrected second signal compensated for differences between frequency sub-bands. In another embodiment, the processor is further configured to receive, from the object, a first signal at the first channel and a second signal at the second channel, perform the compensation by applying the variation to the second signal at a plurality of the frequency sub-bands to obtain a compensated second signal for each of the plurality of frequency sub-bands, for each of the plurality of frequency sub-bands, determine an angle of arrival for the object using the first signal and the compensated second signal at the frequency sub-band, and determine an average angle of arrival for the object from the angles of arrival determined for each of the plurality of frequency sub-bands. The processor is further configured to navigate a vehicle with respect to the object based on the determined angle of arrival.

In yet another exemplary embodiment, a vehicle is disclosed. The vehicle includes a radar array and a processor. The radar array is configured to generate a linear frequency modulated source signal and includes at least a first channel and a second channel for receiving a reflection of the source signal from the object. The processor is configured to obtain channel responses for the first radar channel and the second radar channel over a bandwidth of a source signal, partition the frequency band into a plurality of frequency sub-bands, for a selected frequency sub-band, determine a variation between the channel response of the first channel and the channel response of the second channel, receive a reflection of the source signal at the first channel and at the second channel, perform a correction to at least the second channel within the frequency sub-band using the determined variation, and determine an angle of arrival for the object based on the correction within the frequency sub-band.

In addition to one or more of the features described herein, the variation for the selected frequency sub-band is a difference between a parameter of a calibration signal received at the first channel and a parameter of the calibration signal received at the second channel. The parameter is at least one of a signal amplitude and a signal phase. The processor is further configured to select a width of the frequency sub-band so that a variation in the channel response for at least one of the first channel and the second channel is less than a selected tolerance within the frequency sub-band. In one embodiment, the processor is further configured to receive, from the object, a first signal at the first channel and a second signal at the compensated second channel, perform the correction by applying the variation to the second signal at a plurality of the frequency sub-bands to obtain a corrected second signal for each of the plurality of frequency sub-bands, compensate for differences between the first signal and the corrected second signal in a first frequency sub-band and the first signal and the corrected second signal in a second frequency sub-band, and determine an angle of arrival using the first signal and the corrected second signal compensated for differences between frequency sub-bands. In another embodiment, the processor is further configured to receive, from the object, a first signal at the first channel and a second signal at the second channel, perform the compensation by applying the variation to the second signal at a plurality of the frequency sub-bands to obtain a compensated second signal for each of the plurality of frequency sub-bands, for each of the plurality of frequency sub-bands, determine an angle of arrival for the object using the first signal and the compensated second signal at the frequency sub-band, and determine an average angle of arrival for the object from the angles of arrival determined for each of the plurality of frequency sub-bands.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

Figure 1:
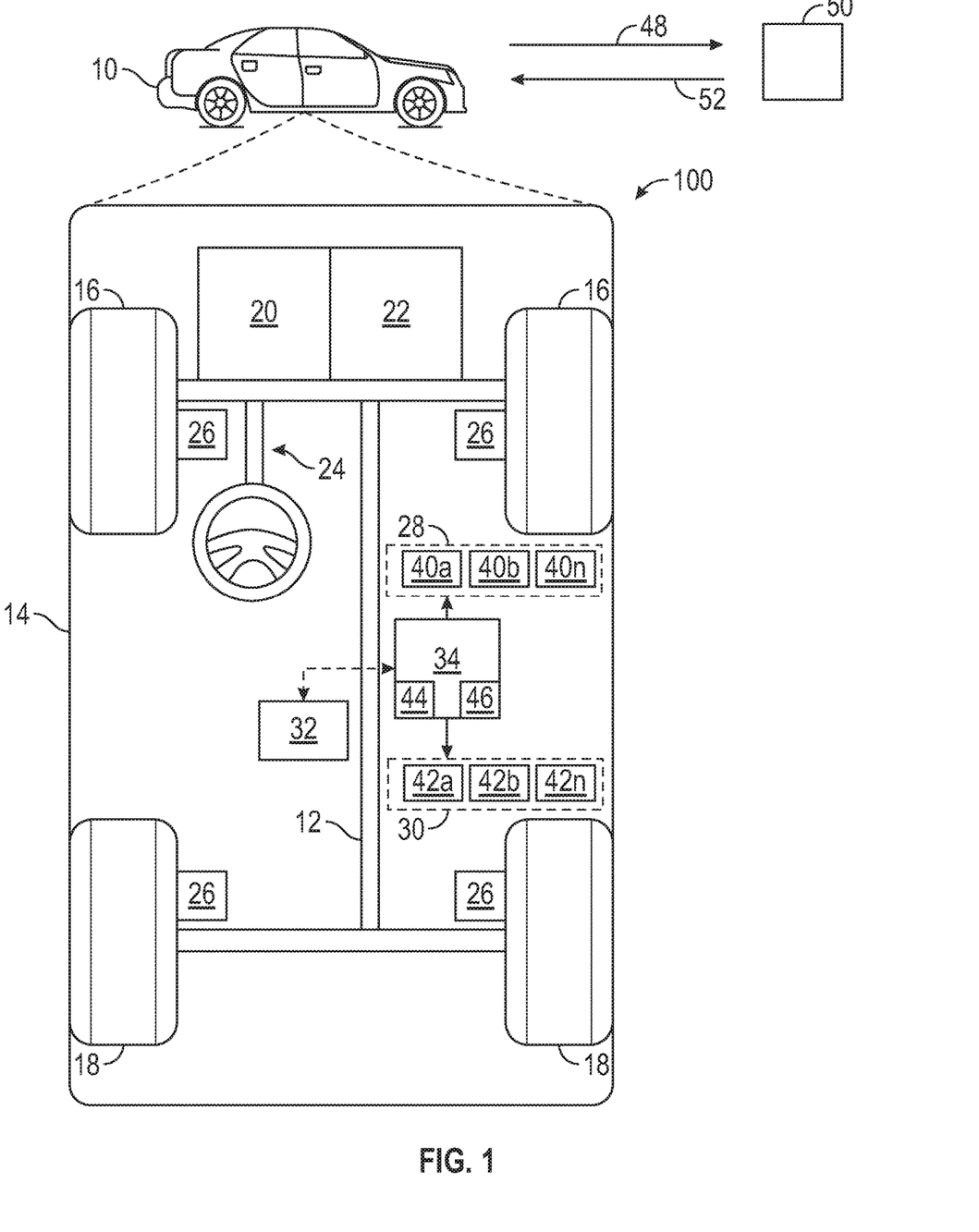
FIG. 1 shows a vehicle with an associated trajectory planning system in accordance with various embodiments.

In accordance with an exemplary embodiment, FIG. 1 shows a vehicle 10 with an associated trajectory planning system depicted at 100 in accordance with various embodiments. In general, the trajectory planning system 100 determines a trajectory plan for automated driving of the vehicle 10. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16 and 18 are each rotationally coupled to the chassis 12 near respective corners of the body 14.

In various embodiments, the vehicle 10 is an autonomous vehicle and the trajectory planning system 100 is incorporated into the autonomous vehicle 10 (hereinafter referred to as the autonomous vehicle 10). The autonomous vehicle 10 is, for example, a vehicle that is automatically controlled to carry passengers from one location to another. The autonomous vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, and at least one controller 34. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16 and 18. The brake system 26 may, in various embodiments, include friction brakes, brake by wire, a regenerative braking system such as an electric machine, and/or other appropriate braking systems. The steering system 24 influences a position of the of the vehicle wheels 16 and 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. In various embodiments, the vehicle 10 includes a radar system including an array of radar sensors, the radar sensors of the radar array being located at various locations along the vehicle 10. In operation, a radar sensor sends out an electromagnetic source pulse 48 that is reflected back at the vehicle 10 by one or more objects 50 in the field of view of the sensor. The source pulse 48 is a linear frequency modulated (LFM) pulse or "chirp" pulse suitable for determining range, Doppler and direction of arrival measurements of the one or more objects 50. The LFM pulse is characterized by having an ultra-wide bandwidth. The radar system further includes circuitry for calibrating the radar array for differences in responses at different frequencies caused by circuitry of the individual radar channels in order to increase a resolution of an angle or arrival parameter.

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as ventilation, music, lighting, etc. (not numbered).

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which includes an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

The trajectory planning system 100 navigates the autonomous vehicle 10 based on a determination of objects and/ their locations within the environment of the vehicle. In various embodiments the controller 34 operates a plurality of radars at various locations on the vehicle 10 to determine a parameter (i.e., range, elevation and azimuth, Doppler frequency) of the object 50 using a plurality of chirp signals and performs a process for mitigating the effects of circuitry on resolution of the angle of arrival parameter. Upon determining various parameters of the object, the controller 34 can operate the one or more actuator devices 42a-n, the propulsion system 20, transmission system 22, steering system 24 and/or brake 26 in order to navigate the vehicle 10 with respect to the object 50.

Figure 2:
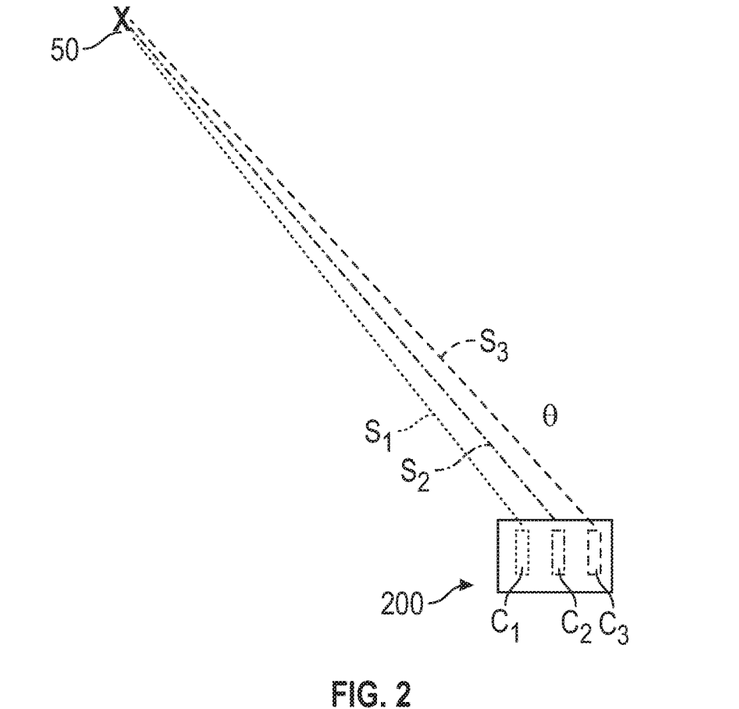
FIG. 2 shows a radar array including a plurality of radar channels.

FIG. 2 shows a radar array 200 including a plurality of radar channels. Three radar channels $C_1$, $C_2$, $C_3$ are shown for illustrative purposes only. The radar array 200 receives signals $S_1$, $S_2$ and $S_3$ from object 50 at channels $C_1$, $C_2$ and $C_3$, respectively. The received signals $S_1$, $S_2$ and $S_3$ are a result of reflection off of object 50 of a source signal transmitted from the radar array 200. The received signals $S_1$, $S_2$ and $S_3$ can be calibration signals during a calibration stage of the radar array 200. A linear-frequency modulated (LFM) signal or "chirp" signal is used in order to determine parameters such as range of the object 50 and Doppler frequency of the object which is related to a radial velocity with respect to the object 50. The angle of arrival (AoA) can be determined from differences in various parameters of the received signals, such as differences in phase and/or differences in amplitude.

The LFM signal is a signal that varies linearly over the duration of the signal, generally increasing linearly with a predetermined rate or slope. In various embodiments, the bandwidth of the source signal is an ultra-wide bandwidth. The response of the circuitry of the channels tends to vary with frequency over this bandwidth, resulting in responses that vary differently across channels.

Figure 3:
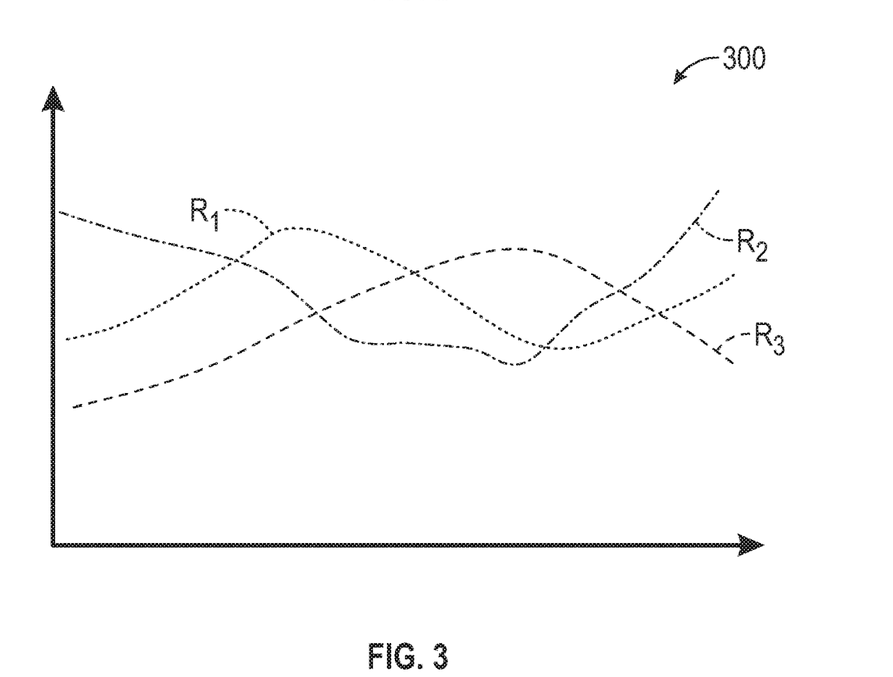
FIG. 3 shows a graph of various antenna responses for the various channels of the radar array of FIG. 2.

FIG. 3 shows a graph 300 of various channel responses for the various channels of the radar array 200 of FIG. 2. Channel responses $R_1$, $R_2$ and $R_3$ are the response of channels $C_1$, $C_2$ and $C_3$, respectively, to signals $S_1$, $S_2$ and $S_3$, where signals $S_1$, $S_2$ and $S_3$ are calibration signals. A parameter of the channel responses $R_1$, $R_2$ and $R_3$ is plotted along the y-axis plotted and frequency is plotted along the x-axis. For a calibrated signal, the signal parameter can be a signal amplitude or signal phase, in various embodiments. The channel responses $R_1$, $R_2$ and $R_3$ vary as a function of frequency. Additionally, the variation in channel response $R_1$ is different from the variation in channel response $R_2$, which are both different from the variation in channel response $R_3$.

The method disclosed herein reduces the effects of these variations in channel response on received signals during a detection of an object. In particular, the frequency band is partitioned into a plurality of frequency sub-bands and variations between channel responses are recorded within the frequency sub-bands. These variations are then used to correct signals received during a detection of an object 50. The corrected signals are then used to determine an angle of arrival of the signal and hence the angular location of the object.

Figure 4:
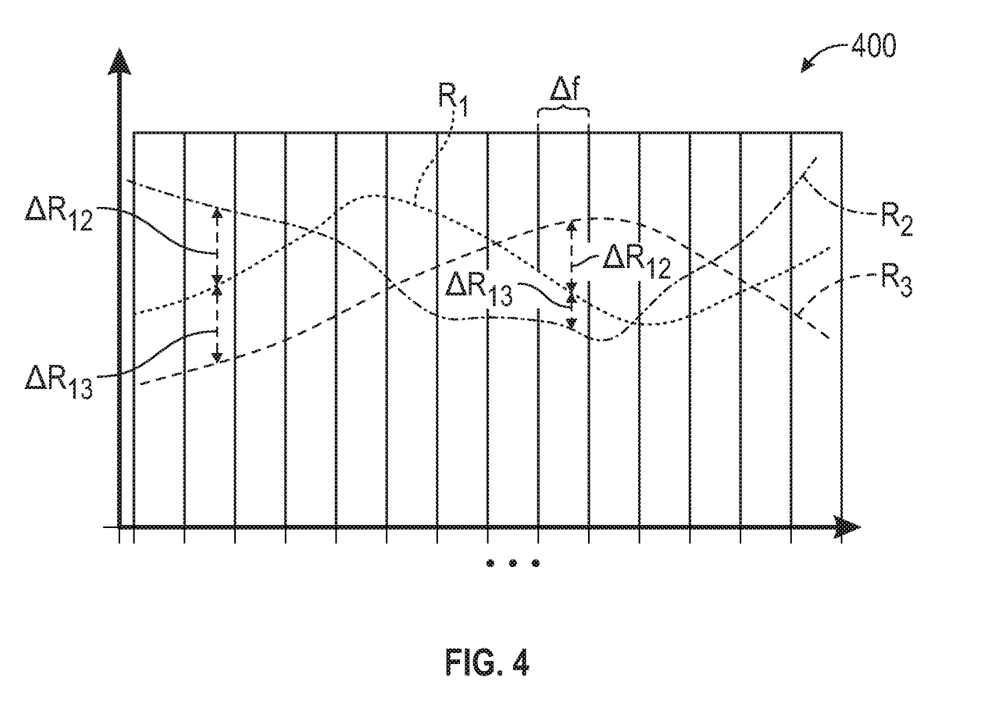
FIG. 4 shows a graph of the various channel responses of FIG. 3 with frequency band partitioning.

FIG. 4 shows a graph 400 of the various channel responses of FIG. 3 with frequency band partitioning. The frequency band is partitioned into a plurality of frequency sub-bands, labelled $f_1, f_2, \ldots, f_N$. The width $\Delta f$ of a frequency sub-band is selected so that the variation of the channel response within the frequency sub-band is less than a selected criterion or constraint on signal variation. The criterion or constraint for the bandwidth $\Delta f$ of the frequency sub-band is given in Eq. (1):

$$\max|Y(f_m,f_n+\Delta f)|-\min|y(f_m,f_n+\Delta f)|<C \qquad \text{Eq. (1)}$$

where y(f) is the channel response at frequency f, $[f_n, f_n+\Delta]$ in the range from frequency $f_n$ to frequency $f_n+\Delta$. In Eq. (1), the bandwidth $\Delta f$ of the frequency sub-band is the largest value for which the difference between the maximum response value and the minimum response value within the frequency sub-band is less than a selected value. In various embodiments, the value of C is 2 decibels.

Once the frequency band has been partitioned into sub-bands, variations can be determined between channel responses within each sub-band. For illustrative purposes, for the second frequency sub-band, variation $\Delta R_{12}$ is shown between the value of channel response $R_1$ and the value of channel response $R_2$ within the second frequency sub-band. Also, a variation $\Delta R_{13}$ is shown between the value of channel signal $S_1$ and the value of channel signal $R_3$ within the second frequency sub-band. If the signal response of FIG. 4 is an amplitude (Amp), then an amplitude variation is an amplitude variation $\Delta Amp_{12}$ between the amplitude $Amp_1$ of the signal of channel $C_1$ and the value of amplitude $Amp_2$ of the signal of channel $C_2$ within the sub-band, and an amplitude variation $\Delta Amp_{13}$ can be determined between the value of amplitude $Amp_1$ of the signal of channel $C_1$ and the value of amplitude $Amp_3$ of the signal of channel $C_3$ within the sub-band. If the signal response of FIG. 4 is a phase φ, then a signal variation is a phase variation $\Delta \varphi_{12}$ between the phase $\varphi_1$ of channel $C_1$ and the value of phase $\varphi_2$ of channel $C_2$ within the sub-band, and a phase variation $\Delta \varphi_{13}$ can be determined between the value of phase $\varphi_1$ of channel $C_1$ and the value of phase $\varphi_3$ of channel $C_3$ within the sub-band. The differences in amplitude, phase and other suitable parameter are determine for each frequency sub-band and these difference can be stored in a table.

Figure 5:
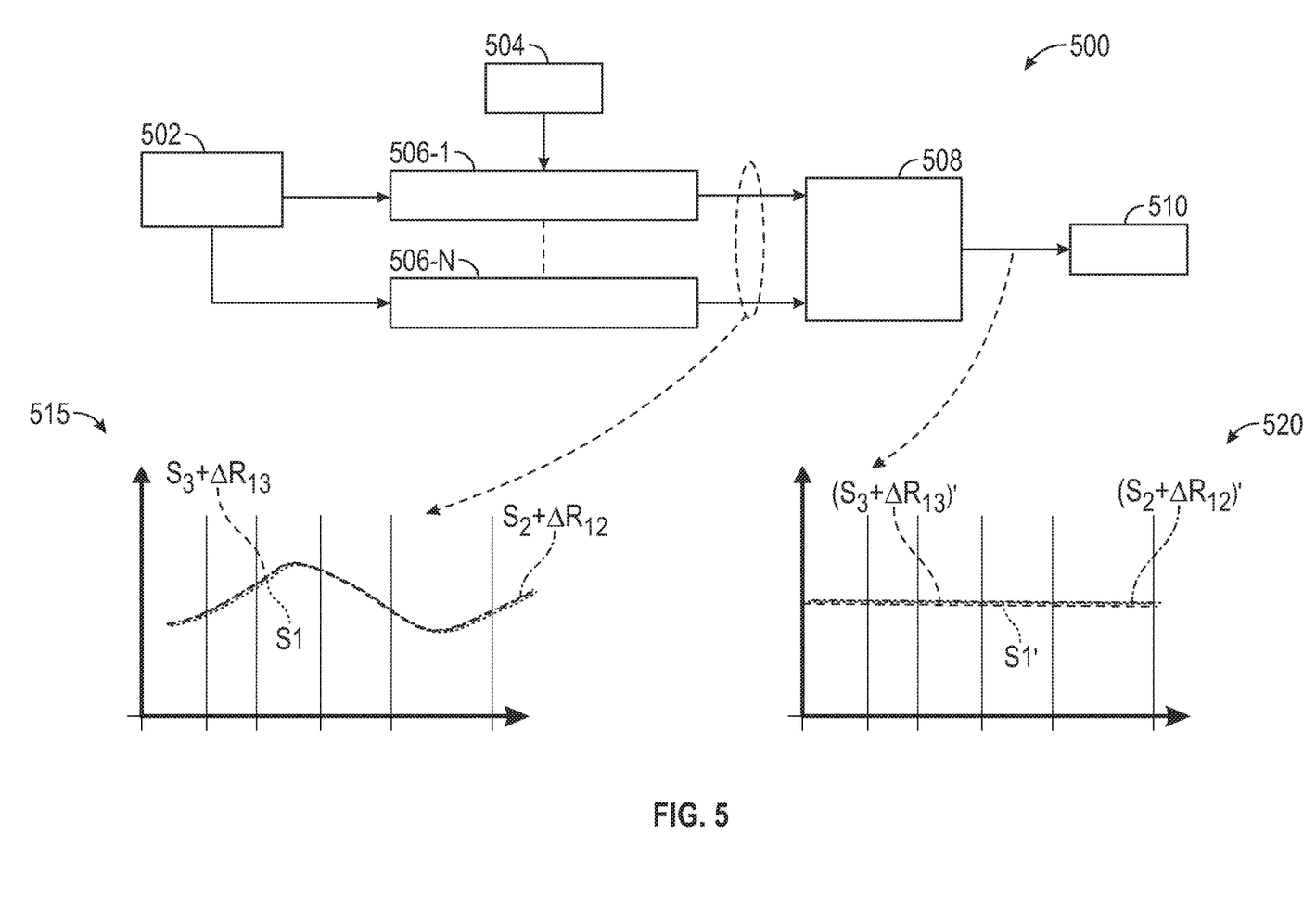
FIG. 5 shows a schematic diagram illustrating use of the variations stored in the table in order to determine an angle of arrival in one embodiment.

FIG. 5 shows a schematic diagram 500 illustrating use of the variations stored in the table in order to determine an angle of arrival in one embodiment. In box 502, channel responses $R_1$, $R_2$ and $R_3$ are determined for each channel $C_1$, $C_2$ and $C_3$, respectively during a calibration stage and a variation table is determined for a selected reference channel (e.g., channel $C_1$) to record the differences or variations in the channel responses (e.g., $\Delta R_{12}$, $\Delta R_{13}$) between the different channels. In box 504, signals $S_1$, $S_2$ and $S_3$ are received at channels $C_1$, $C_2$ and $C_3$, respectively from an object 50. Boxes 506-1 through 506-n represent the same correction procedure being performed in each frequency sub-band f1 through $f_N$. Discussing box 506-1 for ease of explanation, the variations are applied to the signals in the non-reference channels (e.g., signal $S_2$ in channel $C_2$ and sing $S_3$ in signal $C_3$) in order to obtain compensated channel responses that are the same for all channels in the first frequency sub-band ($f_1$). The corrected signals are ($S_1$, $S_2+\Delta R_{12}$, $S_3+\Delta R_{13}$) within frequency sub-band $f_1$. This procedure is performed across all N frequency sub-bands, as indicated by boxes 506-1 through 506-n with the results shown in graph 515. As illustrated in graph 515, the results of applying the correction tends to align the corrected signals. However, the corrected signals are different from one frequency sub-band to another. In box 508, the corrected signals are compensated for the differences across the frequency sub-bands. As shown in graph 520, the compensated signals are indicated by $S_1'$, $(S_2+\Delta R_{12})'$ and $(S_3+\Delta R_{13})'$. The result of this compensation is that the signals are approximately aligned across the frequency sub-bands. In box 510, remaining variations between the aligned signals are used to determine an angle of arrival for the object 50.

Figure 6:
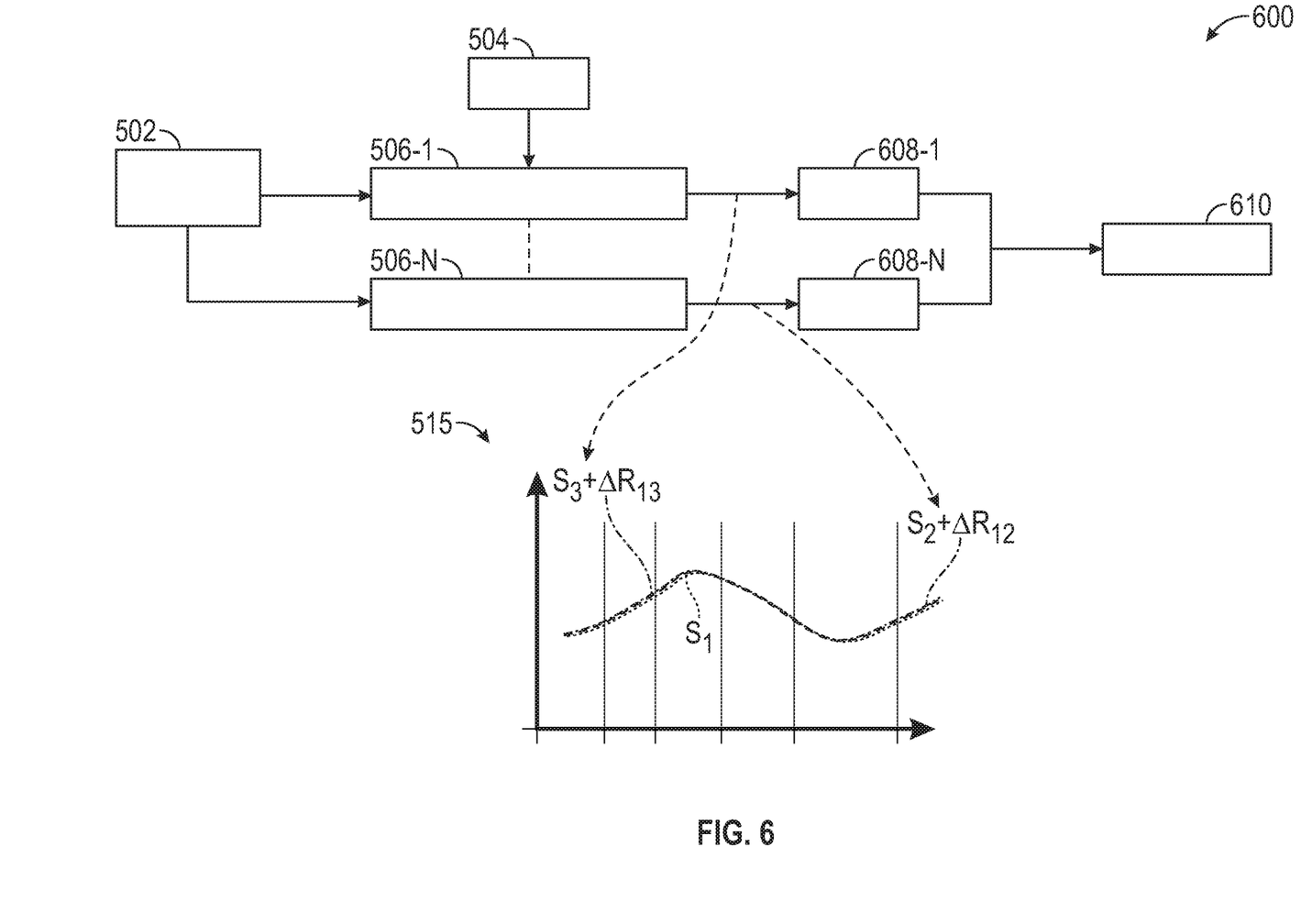
FIG. 6 shows a schematic diagram illustrating use of the variations stored in the table in order to determine an angle of arrival in another embodiment.

FIG. 6 shows a schematic diagram 600 illustrating use of the variations stored in the table in order to determine an angle of arrival in another embodiment. In box 502, channel responses $R_1$, $R_2$ and $R_3$ are determined for each channel $C_1$, $C_2$ and $C_3$, respectively, during a calibration stage and a variation table is determined for a selected reference channel (e.g., channel $C_1$) to record the differences or variations in the channel responses (e.g., $\Delta R_{12}$, $\Delta R_{13}$) between the different channels. In box 504, signals $S_1$, $S_2$ and $S_3$ are received from an object 50. In boxes 506-1 through 506-n, the signals in the non-reference channels (e.g., $S_2$ in channel $C_2$ and $S_3$ in channel $C_3$) are corrected by applying the relevant variation. For example, for sub-band $f_1$, the signals are corrected to obtain corrected signals ($S_1$, $S_2+\Delta R_{12}$, $S_3+\Delta R_{13}$). This process is performed across all of the sub bands, as indicated by boxes 506-1 through 506-n and as shown in graph 515. The process of FIG. 6 is the same as the process of FIG. 5 up to this point. The difference between these processes is discussed with respect to boxes 608-1 through 608-n and box 610. In boxes 608-1 through 608-n, an angle of arrival (AoA) is determined for each frequency sub-band using the first signal, the corrected second signal and the corrected third signal, within the frequency sub-band. In box 610, the AoA for each frequency sub-band are used to obtain an average angle of arrival over the frequency range.

Figure 7:
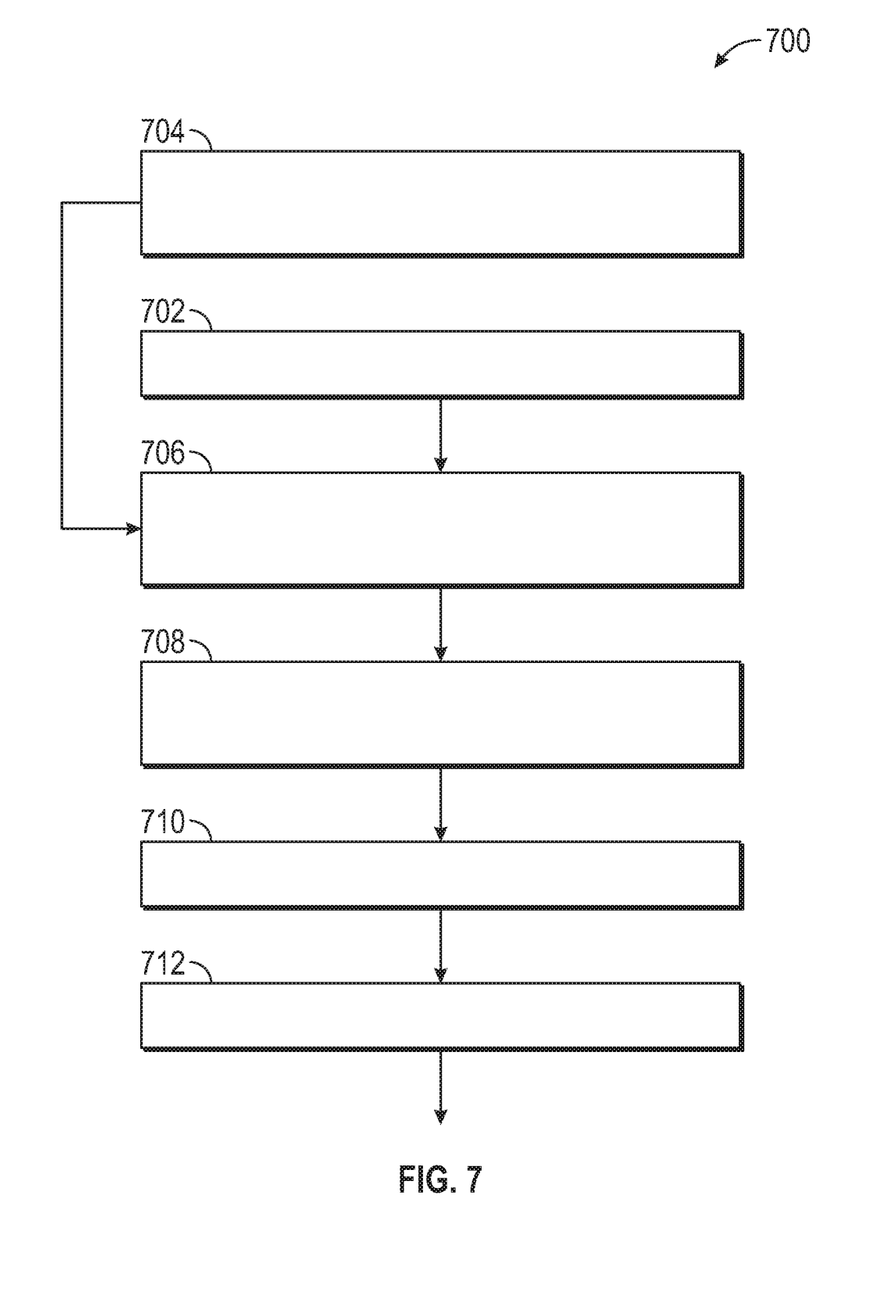
FIG. 7 shows a flowchart illustrate a method for determining angle of arrival of a signal at a radar array that reduces the effects of signal distortion at the channels of the radar array.

FIG. 7 shows a flowchart illustrate a method 700 for determining angle of arrival of a signal at a radar array that reduces the effects of signal distortion at the channels of the radar array. In box 702, variations are determined between parameter values of channel signals in separate channels in response to a calibration signal for each frequency sub-band and stored in a table. In box 704, a LFM source signal is transmitted into an environment of the radar array, wherein a reflection of the LFM signal is received at the channels of the radar array. In box 706, the signals are corrected by partitioning the signal into a plurality of frequency sub-bands and correcting for difference in channel responses within each frequency sub-band. In box 708, range and Doppler filter are performed for each of the channels. In box 710, beamforming is performed using the range and Doppler measurements. In box 712, peak detection is performed in order to determine an estimated angle of arrival.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method of determining an angle of arrival of an object using a radar system, comprising:
    obtaining channel responses for a first radar channel and a second radar channel over a bandwidth of a frequency band;
    partitioning the frequency band into a plurality of frequency sub-bands;
    for a selected frequency sub-band, determining a variation between the channel response of the first channel and the channel response of the second channel;
    receiving, from the object, a first signal at the first channel and a second signal at the second channel;
    performing a correction to at least the second channel within the frequency sub-band by applying the determined variation to the second signal at the selected frequency sub-band to obtain a corrected second signal for the frequency sub-band;
    compensating for differences between the first signal and the corrected second signal in a first frequency sub-band and the first signal and the corrected second signal in a second frequency sub-band; and
    determining the angle of arrival for the object using the first signal and the corrected second signal for the frequency sub-band.

2. The method of claim 1, wherein the variation for the selected frequency sub-band is a difference between a parameter of a calibration signal received at the first channel and the parameter of the calibration signal received at the second channel.

3. The method of claim 2, wherein the parameter is at least one of: (i) a signal amplitude; and (ii) a signal phase.

4. The method of claim 1, wherein a width of the frequency sub-band is selected so that a variation in the channel response for at least one of the first channel and the second channel is less than a selected tolerance within the frequency sub-band.

5. A method of determining an angle of arrival of an object using a radar system, comprising
    obtaining channel responses for a first radar channel and a second radar channel over a bandwidth of a frequency band;
    partitioning the frequency band into a plurality of frequency sub-bands;
    for a selected frequency sub-band, determining a variation between the channel response of the first channel and the channel response of the second channel;
    receiving, from the object, a first signal at the first channel and a second signal at the second channel;
    performing a correction by applying the variation to the second signal at a plurality of the frequency sub-bands to obtain a corrected second signal for each of the plurality of frequency sub-bands;
    for each of the plurality of frequency sub-bands, determining an angle of arrival for the object using the first signal and the corrected second signal at the frequency sub-band; and
    determining an average angle of arrival for the object from the angles of arrival determined for each of the plurality of frequency sub-bands.

6. The method of claim 1, further comprising navigating a vehicle with respect to the object based on the determined angle of arrival.

7. A radar system for determining an angle of arrival of an object, comprising:
    a radar array for generating a linear frequency modulated source signal, the radar array including at least a first channel and a second channel for receiving a reflection of the source signal from the object; and
    a processor configured to:
        obtain a channel response for the first radar channel and a channel response for the second radar channel over a bandwidth of a source signal;
        partition the frequency band into a plurality of frequency sub-bands;
        for a selected frequency sub-band, determine a variation between the channel response of the first channel and the channel response of the second channel;
        receive the reflection of the source signal as a first signal at the first channel and as a second signal at the second channel;
        perform a correction to at least the second channel within the frequency sub-band by applying the determined variation to the second signal at the plurality of frequency sub-bands to obtain a corrected second signal for each of the plurality of frequency sub-bands;
        compensate for differences between the first signal and the corrected second signal in a first frequency sub-band and the first signal and the corrected second signal in a second frequency sub-band; and
        determine the angle of arrival for the object using the first signal and the second corrected second signal compensated for differences between frequency sub-bands.

8. The radar system of claim 7, wherein the variation for the selected frequency sub-band is a difference between a parameter of a calibration signal received at the first channel and the parameter of the calibration signal received at the second channel.

9. The radar system of claim 8, wherein the parameter is at least one of: (i) a signal amplitude; and (ii) a signal phase.

10. The radar system of claim 7, wherein the processor is further configured to select a width of the frequency sub-band so that a variation in the channel response for at least one of the first channel and the second channel is less than a selected tolerance within the frequency sub-band.

11. A radar system for determining an angle of arrival of an object, comprising:
    a radar array for generating a linear frequency modulated source signal, the radar array including at least a first channel and a second channel for receiving a reflection of the source signal from the object; and
    a processor configured to:
        obtain a channel response for the first radar channel and a channel response for the second radar channel over a bandwidth of a source signal;
        partition the frequency band into a plurality of frequency sub-bands;
        for a selected frequency sub-band, determine a variation between the channel response of the first channel and the channel response of the second channel;
        receive, from the object, the reflection signal as a first signal at the first channel and a second signal at the second channel;
        perform a compensation by applying the variation to the second signal at a plurality of the frequency sub-bands to obtain a compensated second signal for each of the plurality of frequency sub-bands;
        for each of the plurality of frequency sub-bands, determine an angle of arrival for the object using the first signal and the compensated second signal at the frequency sub-band; and determine an average angle of arrival for the object from the angles of arrival determined for each of the plurality of frequency sub-bands.

12. The radar system of claim 7, wherein the processor is further configured to navigate a vehicle with respect to the object based on the determined angle of arrival.

13. A vehicle, comprising:
a radar array for generating a linear frequency modulated source signal, the radar array including at least a first channel and a second channel for receiving a reflection of the source signal from the object; and
a processor configured to:
obtain channel responses for the first radar channel and the second radar channel over a bandwidth of a source signal;
partition the frequency band into a plurality of frequency sub-bands;
for a selected frequency sub-band, determine a variation between the channel response of the first channel and the channel response of the second channel;
receive the reflection of the source signal as a first signal at the first channel and as a second signal at the second channel;
perform a correction to at least the second channel within the frequency sub-band by applying the determined variation to the second signal at the plurality of frequency sub-bands to obtain a corrected second signal for each of the plurality of frequency sub-bands; and
compensate for differences between the first signal and the corrected second signal in a first frequency sub-band and the first signal and the corrected second signal in a second frequency sub-band; and
determine an angle of arrival for the object using the first signal and the second corrected second signal compensated for differences between frequency sub-bands.

14. The vehicle of claim 13, wherein the variation for the selected frequency sub-band is a difference between a parameter of a calibration signal received at the first channel and the parameter of the calibration signal received at the second channel.

15. The vehicle of claim 14, wherein the parameter is at least one of: (i) a signal amplitude; and (ii) a signal phase.

16. The vehicle of claim 13, wherein the processor is further configured to select a width of the frequency sub-band so that a variation in the channel response for at least one of the first channel and the second channel is less than a selected tolerance within the frequency sub-band.

17. A vehicle, comprising:
a radar array for generating a linear frequency modulated source signal, the radar array including at least a first channel and a second channel for receiving a reflection of the source signal from the object; and
a processor configured to:
obtain channel responses for the first radar channel and the second radar channel over a bandwidth of a source signal;
partition the frequency band into a plurality of frequency sub-bands;
for a selected frequency sub-band, determine a variation between the channel response of the first channel and the channel response of the second channel;
receive, from the object, the reflection signal as a first signal at the first channel and as a second signal at the second channel;
perform the compensation by applying the variation to the second signal at a plurality of the frequency sub-bands to obtain a compensated second signal for each of the plurality of frequency sub-bands;
for each of the plurality of frequency sub-bands, determine an angle of arrival for the object using the first signal and the compensated second signal at the frequency sub-band; and
determine an average angle of arrival for the object from the angles of arrival determined for each of the plurality of frequency sub-bands.

18. The method of claim 5, wherein the variation for the selected frequency sub-band is a difference between a parameter of a calibration signal received at the first channel and a parameter of the calibration signal received at the second channel.

19. The method of claim 18, wherein the parameter is at least one of: (i) a signal amplitude; and (ii) a signal phase.

20. The method of claim 5, wherein a width of the frequency sub-band is selected so that a variation in the channel response for at least one of the first channel and the second channel is less than a selected tolerance within the frequency sub-band.

21. The radar system of claim 11, wherein the variation for the selected frequency sub-band is a difference between a parameter of a calibration signal received at the first channel and a parameter of the calibration signal received at the second channel.

22. The radar system of claim 21, wherein the parameter is at least one of: (i) a signal amplitude; and (ii) a signal phase.

23. The radar system of claim 11, wherein the processor is further configured to select a width of the frequency sub-band so that a variation in the channel response for at least one of the first channel and the second channel is less than a selected tolerance within the frequency sub-band.

24. The vehicle of claim 17, wherein the variation for the selected frequency sub-band is a difference between a parameter of a calibration signal received at the first channel and a parameter of the calibration signal received at the second channel.

25. The vehicle of claim 24, wherein the parameter is at least one of: (i) a signal amplitude; and (ii) a signal phase.

26. The vehicle of claim 17, wherein the processor is further configured to select a width of the frequency sub-band so that a variation in the channel response for at least one of the first channel and the second channel is less than a selected tolerance within the frequency sub-band.

* * * * *